(12) United States Patent
Ahn et al.

(10) Patent No.: US 7,372,811 B1
(45) Date of Patent: May 13, 2008

(54) LOAD BALANCING MODEL FOR MULTILINK FRAME RELAY

(75) Inventors: Chang Ahn, San Jose, CA (US); Swaminathan Sundararaman, Cupertino, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1308 days.

(21) Appl. No.: 09/924,278

(22) Filed: Aug. 7, 2001

(51) Int. Cl.
*H04J 3/14* (2006.01)
*H04L 12/26* (2006.01)

(52) U.S. Cl. .................. 370/231; 370/235; 370/252

(58) Field of Classification Search ........ 370/229–240, 370/218, 254, 358, 389, 390, 252
See application file for complete search history.

(56) References Cited

U.S. PATENT DOCUMENTS

| | | | | |
|---|---|---|---|---|
| 4,703,475 A | * | 10/1987 | Dretzka et al. ............ 370/394 |
| 5,224,099 A | | 6/1993 | Corbalis et al. |
| 5,274,643 A | | 12/1993 | Fisk |
| 5,313,454 A | | 5/1994 | Bustini et al. |
| 5,359,592 A | | 10/1994 | Corbalis et al. |
| 5,420,857 A | * | 5/1995 | Jurkevich ................... 370/409 |
| 5,422,880 A | | 6/1995 | Heitkamp et al. |
| 5,488,609 A | * | 1/1996 | Hluchyj et al. ............ 370/232 |
| 5,561,663 A | | 10/1996 | Klausmeier |
| 5,617,417 A | | 4/1997 | Sathe et al. |
| 5,687,167 A | * | 11/1997 | Bertin et al. ............... 370/254 |
| 5,729,546 A | | 3/1998 | Gupta et al. |
| 5,793,744 A | * | 8/1998 | Kanerva et al. ............ 370/209 |
| 5,825,748 A | * | 10/1998 | Barkey et al. .............. 370/236 |
| 5,898,691 A | | 4/1999 | Liu |
| 5,920,545 A | * | 7/1999 | Rasanen et al. ............ 370/232 |
| 5,926,475 A | | 7/1999 | Saldinger et al. |
| 5,936,940 A | * | 8/1999 | Marin et al. ................ 370/232 |
| 5,940,372 A | * | 8/1999 | Bertin et al. ............... 370/238 |
| 5,970,067 A | | 10/1999 | Sathe et al. |
| 6,052,385 A | * | 4/2000 | Kanerva et al. ............ 370/468 |
| 6,061,348 A | | 5/2000 | Castrigno et al. |
| 6,084,858 A | * | 7/2000 | Matthews et al. .......... 370/238 |
| 6,115,374 A | | 9/2000 | Stonebridge et al. |
| 6,160,808 A | * | 12/2000 | Maurya ...................... 370/389 |
| 6,198,723 B1 | * | 3/2001 | Parruck et al. ............. 370/230.1 |
| 6,256,309 B1 | | 7/2001 | Daley et al. |
| 6,356,546 B1 | * | 3/2002 | Beshai ....................... 370/358 |
| 6,366,559 B1 | * | 4/2002 | Krishnan et al. ........... 370/230 |
| 6,452,901 B1 | * | 9/2002 | Yang et al. ................. 370/231 |
| 6,493,317 B1 | * | 12/2002 | Ma ............................. 370/237 |
| 6,496,504 B1 | * | 12/2002 | Malik ......................... 370/390 |

(Continued)

*Primary Examiner*—Alpus H. Hsu
(74) *Attorney, Agent, or Firm*—Blakely, Sokoloff, Taylor & Zafman LLP (57) ABSTRACT

A system and method for load balancing transmissions across a multilink frame relay connection is disclosed. A credit value is assigned to each bundle link in the multilink based on the amount of data transmitted over a set period of time. Frames or frame fragments are sent over the link with the highest credit value. Credit is subtracted from the link in proportion to the size of the frame or frame fragment. When two or more links have the same credit value, the frame or fragment is sent over the slowest link. The credit values are reset when a specified time period has passed, a link has a negative credit value, or all the links have a credit value of zero.

47 Claims, 7 Drawing Sheets

U.S. PATENT DOCUMENTS

| | | |
|---|---|---|
| 6,526,060 B1 | 2/2003 | Hughes et al. |
| 6,563,809 B1 * | 5/2003 | Proctor et al. ............... 370/335 |
| 6,608,813 B1 * | 8/2003 | Chiussi et al. ............... 370/218 |
| 6,678,264 B1 * | 1/2004 | Gibson ........................ 370/352 |
| 6,721,569 B1 * | 4/2004 | Hashem et al. .............. 455/450 |
| 6,731,599 B1 * | 5/2004 | Hunter et al. ................ 370/229 |
| 6,778,495 B1 * | 8/2004 | Blair ........................... 370/230 |
| 6,826,196 B1 | 11/2004 | Lawrence |
| 2002/0003796 A1 * | 1/2002 | Kugimiya et al. ........... 370/389 |

* cited by examiner

LOAD BALANCING MODEL FOR MULTILINK FRAME RELAY

FIELD OF THE INVENTION

The field of the invention relates to telecommunication. More specifically, it relates to load balancing for multilink frame relay connections.

BACKGROUND OF THE INVENTION

Multilink frame relay connections provide several advantages over the traditional asynchronous transfer mode (ATM) of communication. While ATM can be used to send data over multiple links, by using inverse multiplexing over ATM (IMA), usually the data cells sent must all be of the same size. Additionally, ATM usually requires the links to have the same speed of transfer. Multilink has no such limitations to size and speed.

Large frames are usually fragmented to prevent clogging of the bundle link. A timer is activated when fragments arrive out of sequence, with interior fragments missing. If the timer finishes before a missing fragment reaches the destination, the entire frame is lost.

Figure 1A:
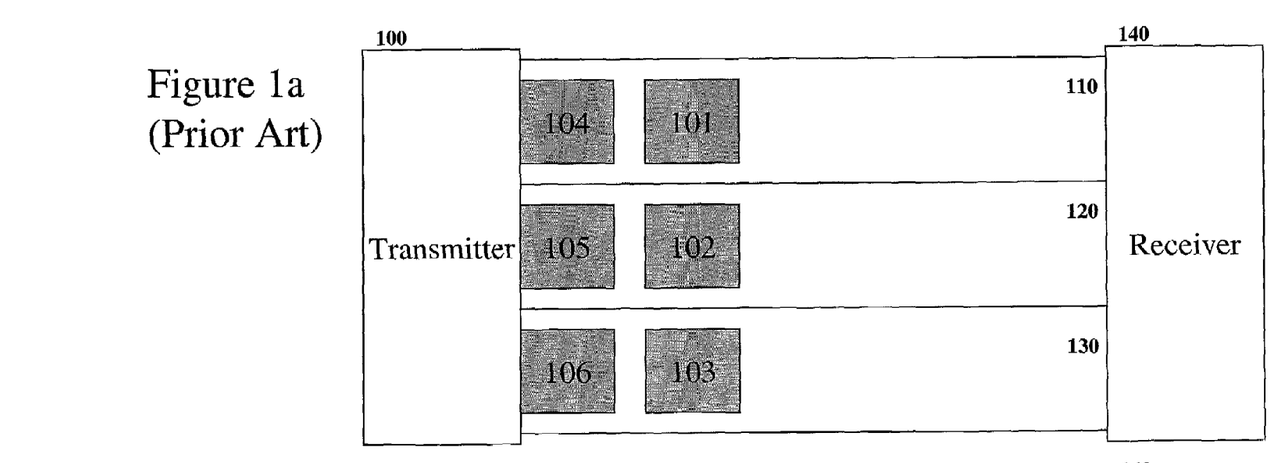
FIGS. 1a and 1b illustrate prior methods of load distribution for a multilink frame relay connection.
Figure 1B:
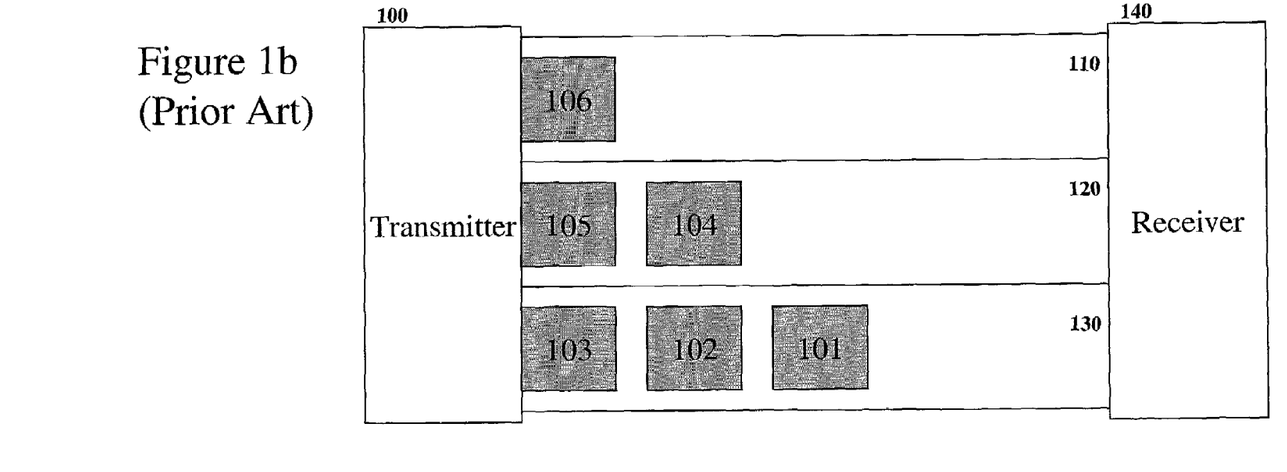

Previously, multilink connections usually used either a round robin or a credit method to determine assign data frames or data frame fragments. Exemplary results of both the round robin method and the credit method are illustrated in FIGS. 1a and 1b. In this example, a transmitter 100 breaks the data frame into six fragments, labeled 101, 102, 103, 104, 105, and 106. The multilink data frame relay connection has three bundle links, each of separate speed ratings. Link 110 has a rating of 1 ds0, link 120 is twice as fast with a rating of 2ds0, and link 130 is three times as fast with a rating of 3ds0. A receiver 140 receives the frame fragments and reassembles the frame. In one embodiment, the transmitter and the receiver are transceivers.

In the round robin method, illustrated in FIG. 1a, a transmitter 100 transmits data frame fragments chronologically into each bundle link, repeating when all links have been used. This method results in fragments 101 and 104 being transmitted in link 110, fragments 102 and 105 being transmitted in link 120, and fragments 103 and 106 being transmitted in link 130. Because of the differentiated speed between links, the order of arrival is then 103, 102, 106, 101, 104, and 105, with 101, 104, and 105 all arriving simultaneously. The fragments arriving in this order would activate the timer, and possibly the whole frame would be lost.

In the credit method, illustrated in FIG. 1b, bundle links are weighted according to link speed. Frames and frame fragments are sent on the fastest link, link 130 in this example, until a threshold is exceeded, at which point the frames and frame fragments are sent on the next fastest link, link 120. This method results in frame fragments 101, 102, and 103 being transmitted on link 130; frame fragments 104 and 105 being transmitted on link 120; and frame fragment 106 being transmitted on link 110. The order of arrival becomes 101, 104, 102, 106, 105, and 103, with 106, 105, and 103 arriving simultaneously. This order also activates the timer and endangers capture of the entire frame.

The reason for this is that, while link 130 transfers data much faster than either link 120 or link 110, as more frame and frame fragments are transmitted through a link, the link is slowed down. The phenomenon is similar to lanes in a freeway. The carpool lane may allow a car to travel faster, but as more cars load into the lane, the speed slows down.

SUMMARY OF THE INVENTION

A system is described that includes a transmitter to send data frames over a multilink data connection. A receiver receives data frames over the multilink data connection. The multilink data connection contains a set of individual links given a credit value based on each link's speed of data transmission and current level of data traffic.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A system and method are described for load balancing the transmission of data frames across a multilink connection. Links in a multilink connection are rated for speed. A credit value is assigned to each bundle link based on the amount of data that can be transmitted across a line in a set period of time. When a frame is sent across a multilink connection, the first frame or frame fragment is sent across the bundle link with the highest credit value. If two links have the same credit value, the frame is sent across the slower of the two links. Once a frame or frame fragment is sent, the credit value of that link is reduced by the size of the frame or frame fragment. All the credit values are reset when one link has a negative credit value or all links have a credit value equal to zero. If the multilink connection is unused for a set period of time, all the credit values are reset.

Figure 2:
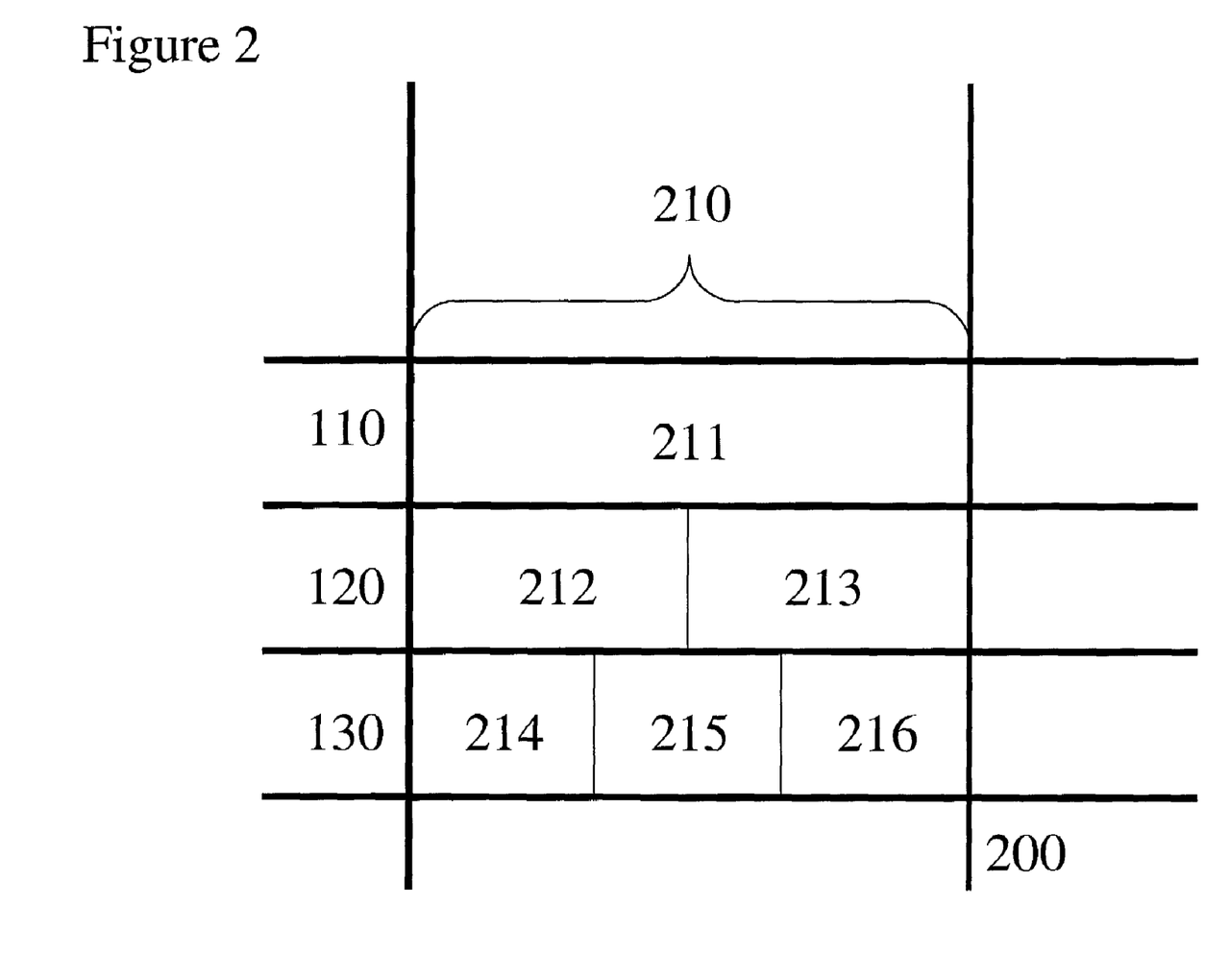
FIG. 2 illustrates variations in band throughput for different bundle links in a multilink connection.

For one embodiment, a credit value is assigned to each link based on how much data can be transmitted through the link in a given period of time. An example of the differing rates at which data can be transferred and how this difference affects credit values is illustrated in FIG. 2. For one embodiment, a time period 200 is chosen in relation to the time required to transfer a frame 211 of a given length 210 over the slowest link 110. For one embodiment, if the length 210 is 80 bytes, and only one frame 211 is able to pass over link 110, link 110 will have a credit value of 80. Link 120, which is twice as fast as link 110, can transmit equivalent frames 212 and 213 in the same period of time 200. Therefore, link 120 has a rating of 160. Link 130, which is three times as fast as link 110, can transmit equivalent frames 214, 215, and 216 in the same period of time 200. Therefore, link 130 has a credit value of 240.

Figure 3:
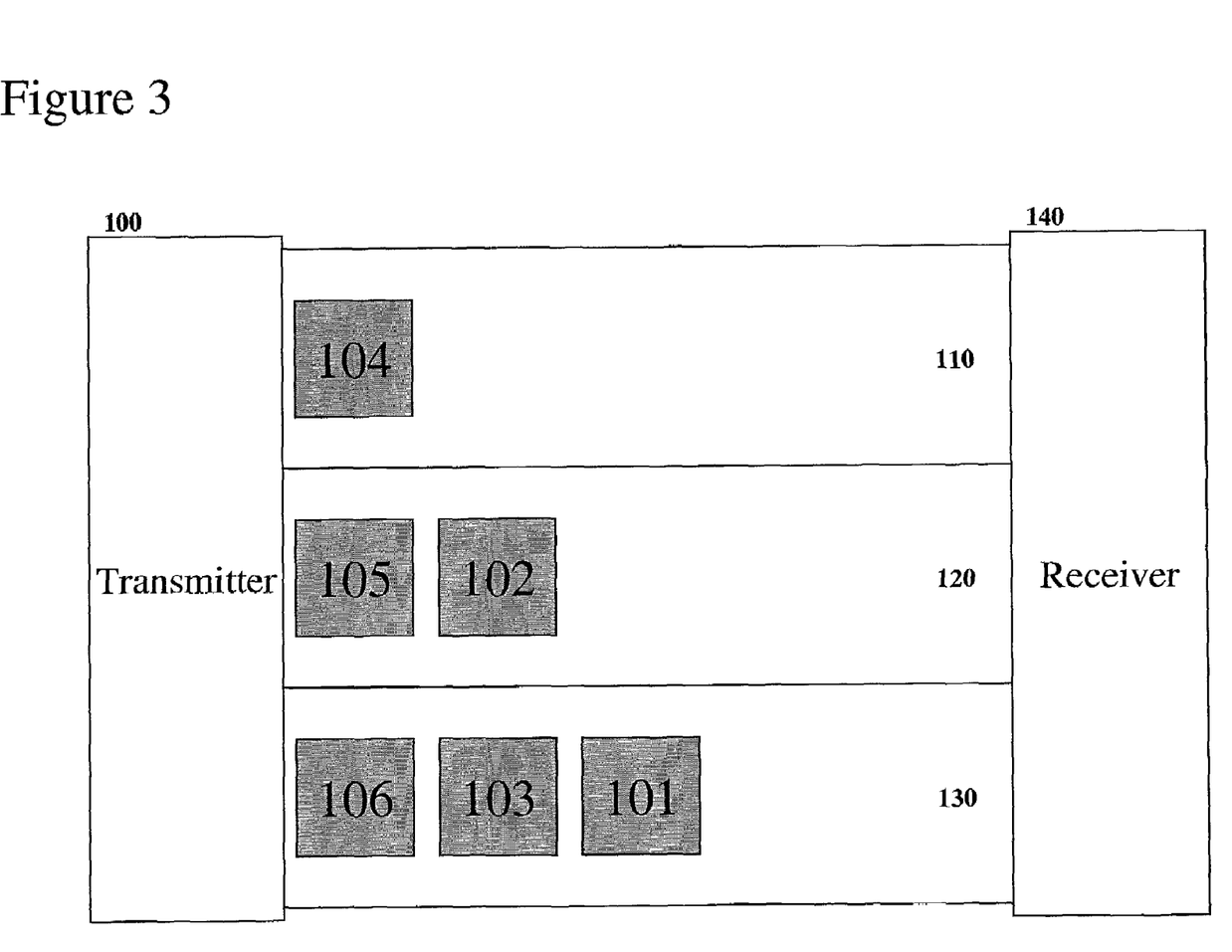
FIG. 3 illustrates the final distribution of fragments when using the system.

The results of these credit values produce an exemplary distribution illustrated in FIG. 3. As link 130 has the highest credit value with 240, the first frame fragment 101 is transmitted on that link. If the frame fragment has a size of 80 bytes, then the credit value is reduced by that amount. Now link 130 and link 120 both have a credit value of 160. Frame fragment 102 is transmitted on link 120, as link 120 is slower than 130. As link 130 again has the highest credit value with 160, frame fragment 103 is transmitted on the link. As all links now have a credit value of 80, the frames are sent on the slowest available link, with frame fragment 104 on link 110, frame fragment 105 on link 120, and frame fragment 106 on link 130. The receiver 140 receives the frame fragments in the order 101, 102, 103, 104, 105, and 1-06.

Figure 4:
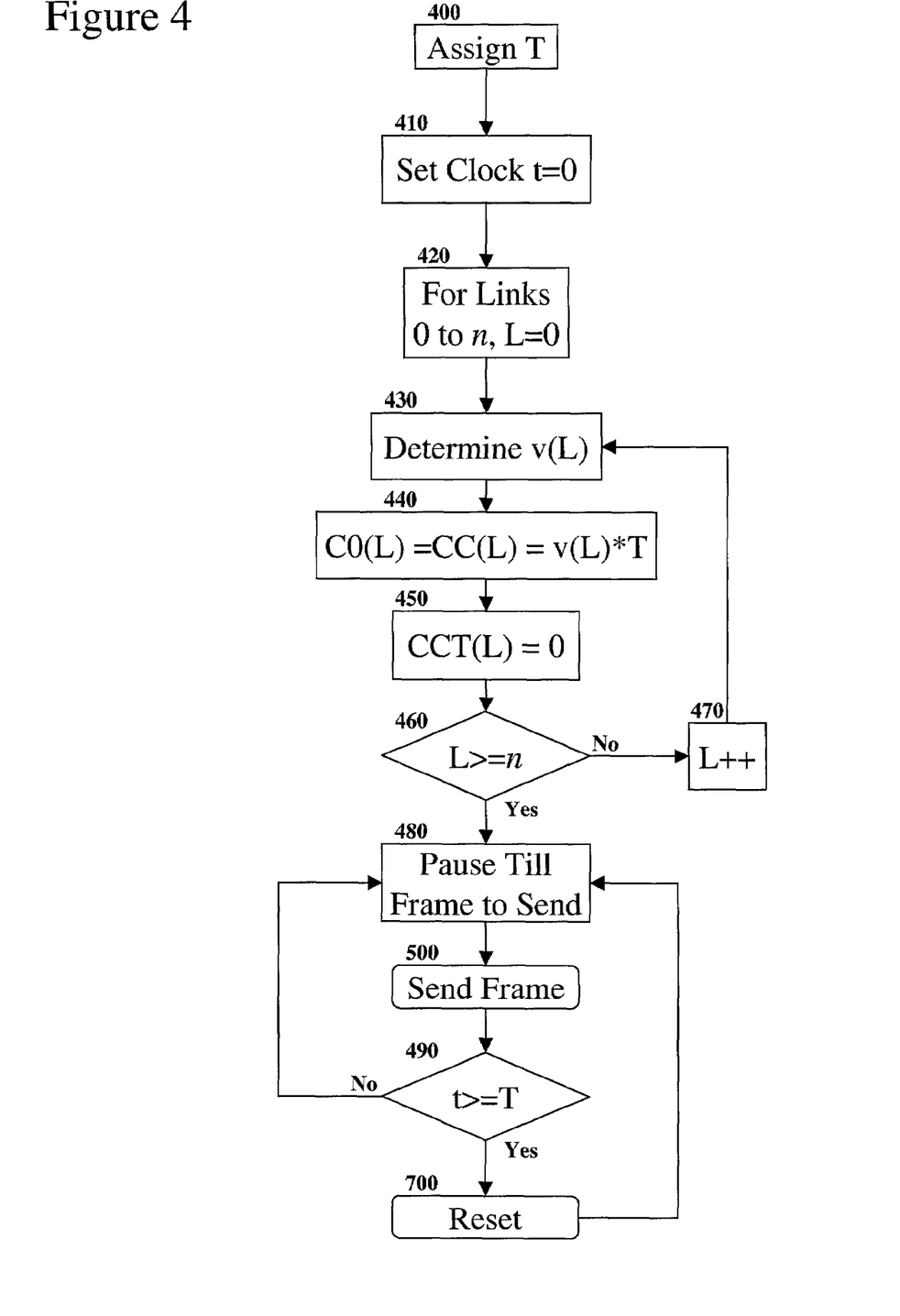
FIG. 4 is a flowchart of a method for setting up a system to send a balance load through a multilink frame relay connection.

One embodiment of a method is illustrated in FIG. 4. A time period (T) is assigned over which to measure data throughput and to initiate the timed reset 400. For other embodiments, separate time periods are chosen to measure throughput and to initiate resets. The clock (t) is reset to zero 410. A link index (L), by which to count links from 0 to n, with n+1 representing the total number of links, is set to 0 to initialize the links 420. The speed of data transmission (v) is determined for link 0 430. The current credit (CC) for link 0, equal to speed times the time period, is determined and assigned as the initial credit value (C0) 440. The credit taken (CCT) is set to 0 450. As long as not all the links have been initialized 460, the index is incremented 470, and the initialization begins again for the next link at the first initialization step 430. After initialization is complete, the process is in sleep mode until a frame is available to be sent 480. Once a frame is available, the frame is transmitted 500. If the time period has not expired once the transmission is completed 490, the process goes back into sleep mode 480. Otherwise, the credits on the links are reset 700.

Figure 5:
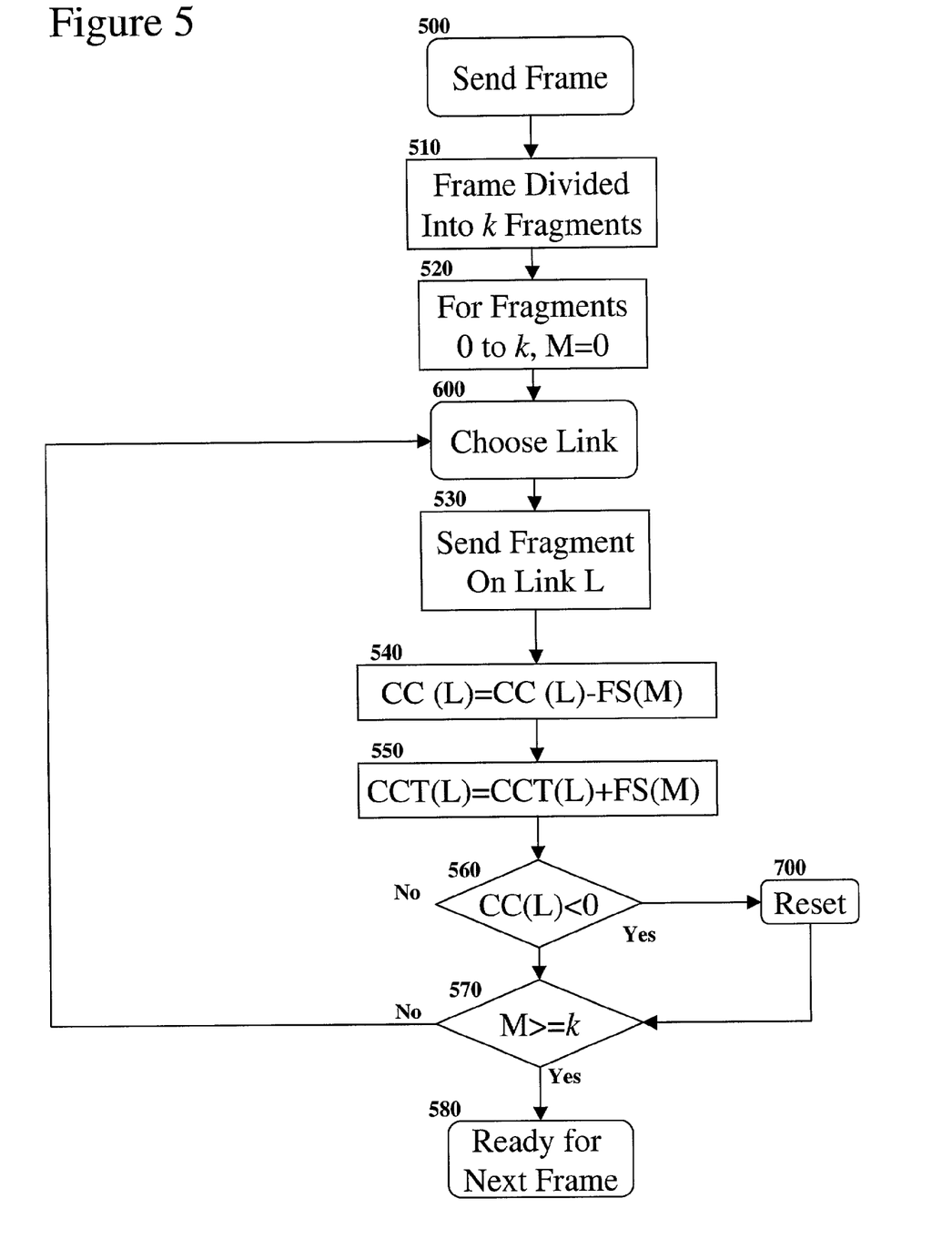
FIG. 5 is a flowchart of a method for sending a frame through the multilink frame relay connection.

One embodiment of a method of transmitting the frames is illustrated in FIG. 5. To send the frame 500, the frame is first divided into k+1 number of frame fragments, where k+1 is a preset number 510. For other embodiments, k+1 is dynamically determined based on the size of the frame. A fragment index (M) is initialized to zero to count the fragments from 0 to k 520. A link choosing subroutine returns the index of the link on which the fragment will be transmitted 600. The fragment is transmitted on the chosen link 530. Current credit (CC) is reduced by the size (FS) of the fragment 540. The current credit taken (CCT) is increased by the fragment size (FS) 550. If the current credit is less than zero 560, all the link credits are reset 700. If current credit is not less than zero and more fragments need to be transmitted 570, a new link is chosen 600. If no fragments are left to be transmitted 570, the process is ready to send the next frame 580.

Figure 6:
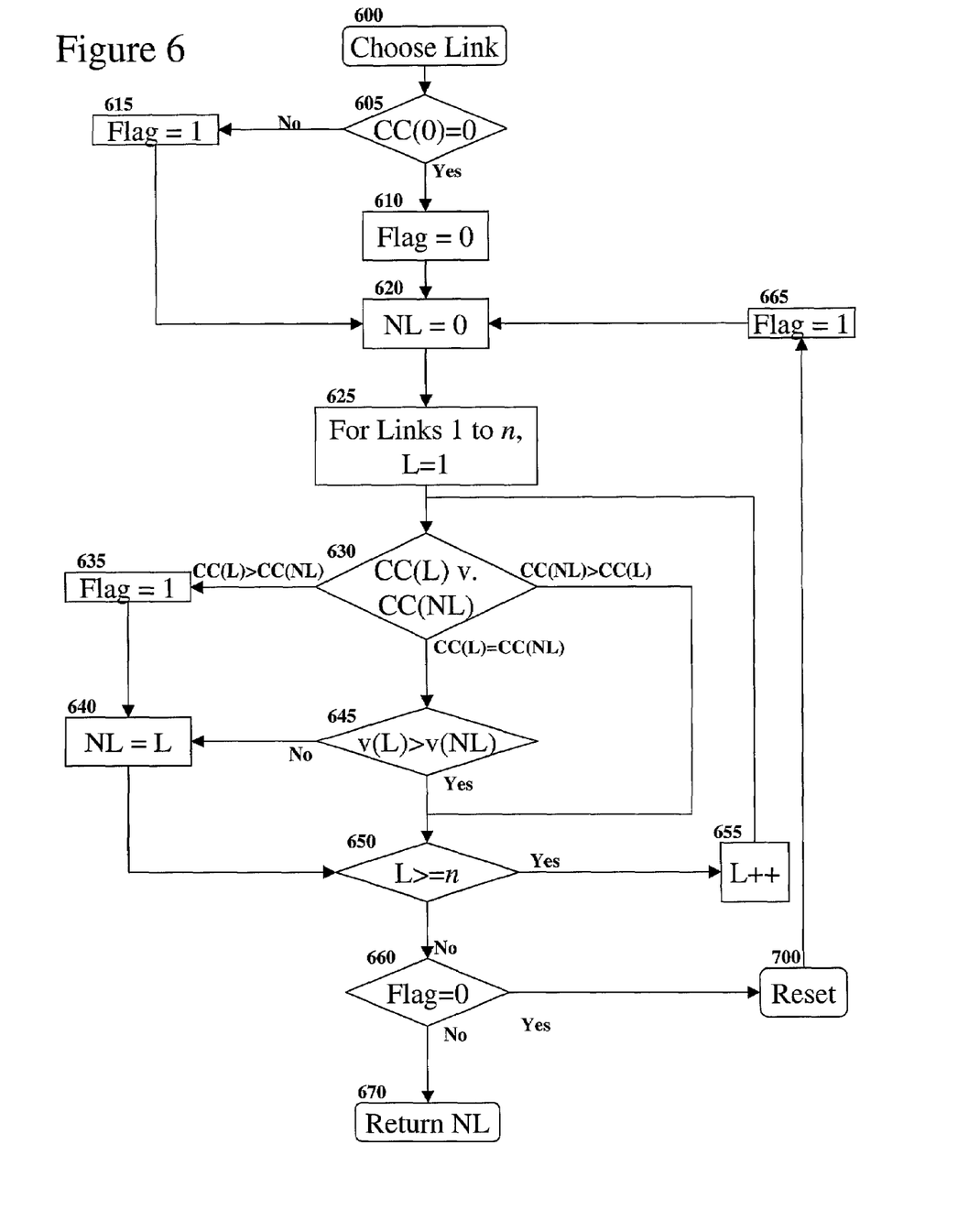
FIG. 6 is a flowchart of a method for choosing a link to send a fragment of a frame of data through in a multilink frame relay connection.

One embodiment of a method of choosing a link is illustrated in FIG. 6. The choose link process is initiated each time a frame fragment is to be sent 600. The current credit of link 0 is tested to see if the value is at zero 605. If the current credit is at zero, the flag is set equal to 0 610. If the current credit is not zero, the flag is set equal to 1 615. An index (NL) to indicate the chosen link to return is set to indicate link 0 620. A regular link index (L) is initialized to 1 to increment through links 1 to n, where n+1 represents the number of links 625. The current credit of link NL is compared with the current credit of link L 630. If the current credit of link L is greater than the current credit of link NL, the flag is set to 1 635 and the chosen link index NL is set equal to L 640. If the current credit of NL is greater than the current credit of link L, the chosen link index remains NL. If the current credits of links L and NL equal each other, the speed (v) of link L is then compared with the speed (v) of link NL 645. If link NL is faster, the chosen link index is set to link L 640. If link L is faster, the index remains the same. If more links exist 650, the index L is incremented 655 and the new link L is compared to link NL 630. After all the links have been compared, the flag is checked to see if the value is still zero 660. If the value is still zero, the indication is that all of the links have a current credit of zero. The credits are reset 700, the flag is set to one 665, and the chosen link index is reset to zero 620. The comparison is then repeated with the reset current credits. After the link is chosen, the chosen link's index is returned to the main process 670.

Figure 7:
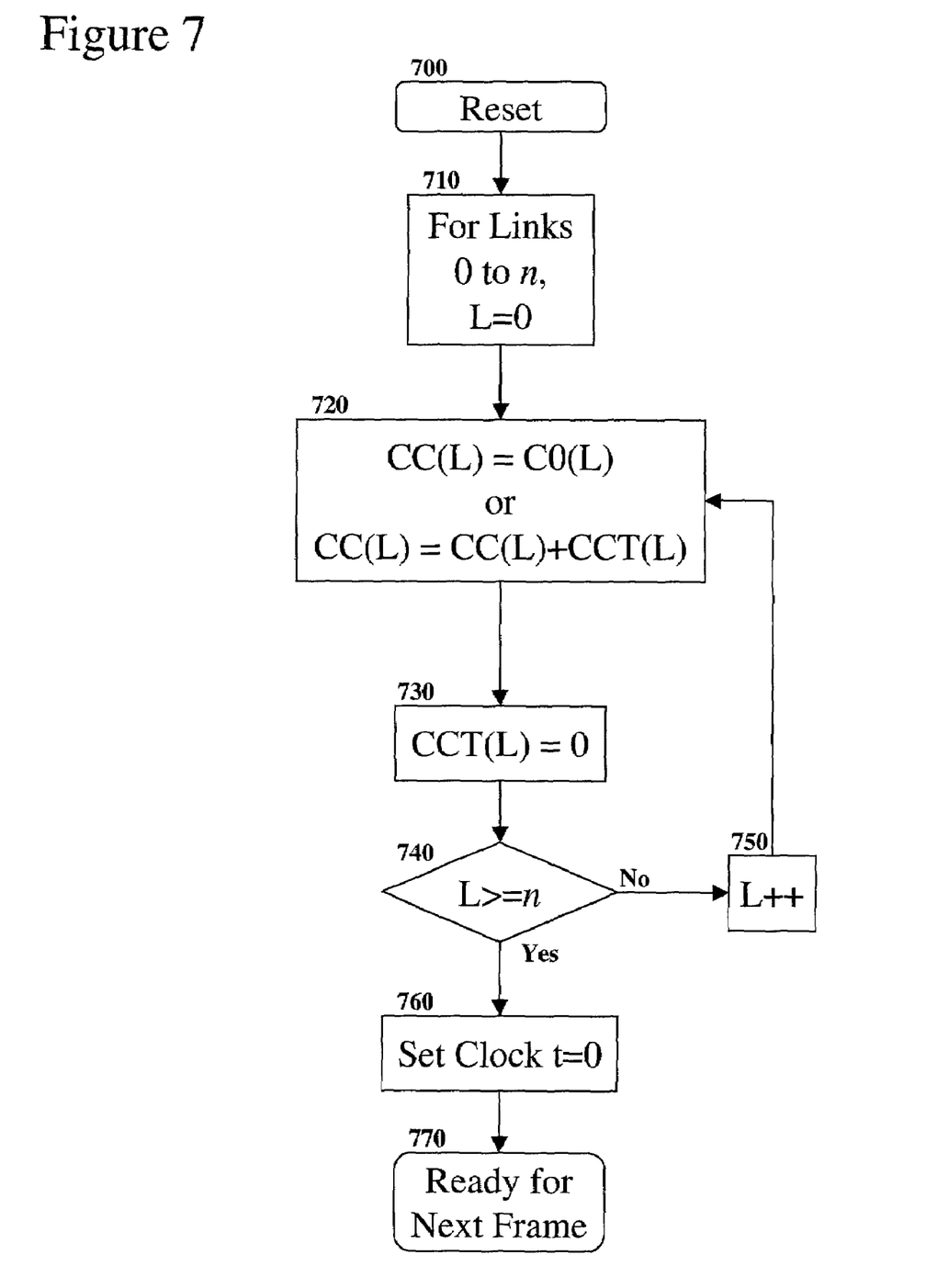
FIG. 7 is a flowchart of a method for resetting the system.

One embodiment of a reset method is illustrated in FIG. 7. An outside process implements the reset method, either because the time period (T) has expired, one of the links has a negative current credit, or all the links had zero current credit 700. A link index (L) is initialized to 0 to increment links 0 through n, where n+1 represents the number of links 710. The current credit (CC) of the link is set to the initial credit (C0) determined when the system was initialized 720. In an alternate embodiment, the current credit (CC) is set equal to the sum of that link's current credit plus the current credit taken (CCT) 720. The current credit taken (CCT) is set to zero 730. If a link has not been reset 740, the link index is incremented 750 and the next link is reset 720. After all the links have been reset 740, the clock is reset to zero 760. The system is then ready for the next frame 770.

The method and apparatus disclosed herein may be integrated into advanced Internet-based or network-based knowledge systems as related to information retrieval, information extraction, and question and answer systems.

The method described above can be stored in the memory of a computer system (e.g., set top box, video recorders, etc.) as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system, comprising:
   a multilink data connection, containing a set of individual links given a set of credit values based on speed of data transmission and current level of data traffic for each link, wherein the set of credit values includes an initial credit value equal to data capable of being sent over the link in a set period of time and a current credit value equal to the initial credit value minus data currently being transmitted;

a transmitter to send data units over the multilink data connection, wherein each data unit is sent over the link having the largest credit value among the set of individual links and the credit value is reset in response to a predetermined event; and a receiver to receive data units over the multilink data connection.

2. The system of claim 1, wherein the current credit value is reset to the initial credit value originally given.

3. The system of claim 1, wherein reset occurs when all the links have a current credit value of zero.

4. The system of claim 1, wherein reset occurs when a link has a negative current credit value.

5. The system of claim 1, wherein reset occurs when a preset time period has passed.

6. The system of claim 1, wherein the data units are data frames, and wherein, if two links have the same current credit value, the data frame is sent over the link that has a slower speed of data transmission.

7. The system of claim 1, wherein the data units are data frame fragments.

8. A method, comprising:
determining a rating of a link in a multilink data connection based on an amount of data that can be transmitted across the link in a set period of time;
assigning an initial credit value to the link based on the rating;
producing a current credit value by reducing the initial credit value proportionate to an amount of data currently being transmitted on the link;
assigning a data unit to be transmitted across the link based on the current credit value; and
transmitting the data unit across the link.

9. The method of claim 8, wherein the initial value equals the number of bytes of data.

10. The method of claim 8, wherein the data units are data frames, and wherein the data frame is sent over the link that has a credit value greater than the credit value of other links in the multilink data connection.

11. The method of claim 10, wherein, if no single link has a current credit value greater than any other link, the data frame is assigned to the link with a slower speed of data transmission than other links with an equal credit value.

12. The method of claim 8, wherein the data units are data frame fragments, and further including reducing the current credit value after the data frame fragment is sent across the link.

13. The method of claim 12, wherein the current credit value is reduced based on the size of the frame sent.

14. The method of claim 8, further including resetting the current credit value to the initial credit value.

15. The method of claim 14, wherein reset occurs when all the links have a current credit value of zero.

16. The method of claim 14, wherein reset occurs when a link has a negative current credit value.

17. The method of claim 14, wherein reset occurs when a preset time period has passed.

18. A computer readable medium encoded with instructions capable of being executed by a computer to perform a method comprising:
determining a rating of a link in a multilink data connection based on an amount of data that can be transmitted across the link in a set period of time;
assigning an initial credit value to the link based on the rating;
producing a current credit value by reducing the initial credit value proportionate to an amount of data currently being transmitted on the link;
assigning a data unit to be transmitted across the link based on the current credit value; and
transmitting the data unit across the link.

19. The computer readable medium of claim 18, wherein the initial value equals the number of bytes of data.

20. The computer readable medium of claim 18, wherein the data units are data frames, and wherein the data frame is sent over the link that has a credit value greater than the credit value of other links in the multilink data connection.

21. The computer readable medium of claim 18, wherein the data units are data frame fragments, and further including reducing the current credit value after the data frame fragment is sent across the link.

22. The computer readable medium of claim 21, wherein the current credit value is reduced based on the size of the frame sent.

23. The computer readable medium of claim 18, further including resetting the current credit value to the initial credit value.

24. The computer readable medium of claim 23, wherein reset occurs when all the links have a current credit value of zero.

25. The computer readable medium of claim 23, wherein reset occurs when a link has a negative current credit value.

26. The computer readable medium of claim 23, wherein reset occurs when a preset time period has passed.

27. The computer readable medium of claim 18, wherein, if no single link has a current credit value greater than any other link, the data frame is assigned to the link with a slower speed of data transmission than other links with an equal credit value.

28. An apparatus, comprising:
means for determining a rating of a link in a multilink data connection based on an amount of data that can be transmitted across the link in a set period of time;
means for assigning an initial credit value to the link based on the rating;
means for producing a current credit value by reducing the initial credit value proportionate to an amount of data currently being transmitted on the link;
means for assigning a data unit to be transmitted across the link based on the current credit value; and
means for transmitting the data unit across the link.

29. The apparatus of claim 28, wherein the initial value equals the number of bytes of data.

30. The apparatus of claim 28, wherein the data units are data frames, and wherein the data frame is sent over the link that has a credit value greater than the credit value of other links in the multilink data connection.

31. The apparatus of claim 30, wherein, if no single link has a current credit value greater than any other link, the data frame is assigned to the link with a slower speed of data transmission than other links with an equal credit value.

32. The apparatus of claim 28, wherein the data units are data frame fragments, and further including a means for reducing the current credit value after the data frame fragment is sent across the link.

33. The apparatus of claim 32, wherein the current credit value is reduced based on the size of the frame sent.

34. The apparatus of claim 28, further including a means for resetting the current credit value to the initial credit value.

35. The apparatus of claim 34, wherein reset occurs when all the links have a current credit value of zero.

36. The apparatus of claim 34, wherein reset occurs when a link has a negative current credit value.

37. The apparatus of claim 34, wherein reset occurs when a preset time period has passed.

38. An apparatus, comprising:
- a receiver to receive data units over a multilink data connection; and
- a transmitter to send data units over the multilink data connection, the multilink data connection containing a set of individual links given a set of credit values based on speed of data transmission and current level of data traffic for each link, wherein the set of credit values includes an initial credit value equal to data capable of being sent over the link in a set period of time and a current credit value equal to the initial credit value minus data currently being transmitted, and wherein if two links have the same credit value, a data unit is sent over the link that has a slower speed of data transmission.

39. The apparatus of claim 38, wherein the current credit value is reset to the initial credit value originally given.

40. The apparatus of claim 39, wherein reset occurs when all the links have a current credit value of zero.

41. The apparatus of claim 39, wherein reset occurs when a link has a negative current credit value.

42. The apparatus of claim 39, wherein reset occurs when a preset time period has passed.

43. The apparatus of claim 38, wherein the data units are data frames, and wherein the data frame is sent over the link with the current credit value that is largest.

44. The apparatus of claim 38, wherein the data units are data frame fragments.

45. A method, comprising:
- determining a rating of a link in a multilink data connection based on an amount of data that can be transmitted across the link in a set period of time;
- assigning an initial credit value to the link based on the rating;
- producing a current credit value by reducing the initial credit value proportionate to an amount of data currently being transmitted on the link;
- assigning a data unit to be transmitted across the link based on the current credit value;
- transmitting the data unit across the link;
- reducing the current credit value after the data unit is sent across the link; and
- resetting the current credit value to the initial credit value.

46. The method of claim 45, wherein the data unit is a data frame.

47. The method of claim 45, wherein the data unit is a data frame segment.

* * * * *